United States Patent
Jang et al.

(10) Patent No.: US 10,428,215 B2
(45) Date of Patent: Oct. 1, 2019

(54) RESIN COMPOSITIONS FOR INTAKE HOSES OF TURBO ENGINES WITH ENHANCED THERMAL RESISTANCE

(71) Applicants: HYUNDAI MOTOR COMPANY, Seoul (KR); KIA MOTORS CORPORATION, Seoul (KR)

(72) Inventors: Young Hak Jang, Seoul (KR); Joon Chul Park, Daegu (KR); Jae Hyeon Jung, Ansan-si (KR); Hyeon Gyun Ahn, Seoul (KR); Sung Hwan Ji, Seongnam-si (KR); Deok Ki Kim, Hwaseong-si (KR); Chung Han Kim, Mungyeong-si (KR); Hee Sok Chang, Cheonan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 126 days.

(21) Appl. No.: 15/814,025

(22) Filed: Nov. 15, 2017

(65) Prior Publication Data
US 2018/0134892 A1    May 17, 2018

(30) Foreign Application Priority Data
Nov. 16, 2016 (KR) .................. 10-2016-0152475

(51) Int. Cl.
*C08L 23/12* (2006.01)
*C08L 67/00* (2006.01)
(Continued)

(52) U.S. Cl.
CPC ............... *C08L 67/00* (2013.01); *C08L 67/02* (2013.01); *C08L 77/02* (2013.01); *C08L 77/06* (2013.01); *F02M 35/10137* (2013.01); *C08L 23/12* (2013.01); *C08L 2201/08* (2013.01); *C08L 2205/03* (2013.01); *C08L 2310/00* (2013.01); *C08L 2666/30* (2013.01); *C08L 2666/38* (2013.01); *C08L 2666/78* (2013.01); *C08L 2666/82* (2013.01)

(58) Field of Classification Search
None
See application file for complete search history.

(56) References Cited

U.S. PATENT DOCUMENTS

| | | | |
|---|---|---|---|
| 5,910,543 A * | 6/1999 | Patel | ........................ C08L 9/02 525/166 |
| 9,334,482 B2 | 5/2016 | Akita et al. | |
| 2014/0142219 A1* | 5/2014 | Akita | ..................... C08L 21/00 523/436 |

FOREIGN PATENT DOCUMENTS

| | | | |
|---|---|---|---|
| EP | 0307802 A2 * | 3/1989 | ................ C08F 4/34 |
| JP | 5278621 | 9/2013 | |

(Continued)

*Primary Examiner* — Richard A Huhn
(74) *Attorney, Agent, or Firm* — Lempia Summerfield Katz LLC

(57) ABSTRACT

A resin composition for intake hoses is provided. The resin composition includes a predetermined amount of polyester elastomer incorporated into a polyamide resin and a polypropylene resin and further includes an antioxidant, a heat stabilizer, a lubricant and a master batch if necessary, thereby exhibiting excellent durability, heat resistance, elongation, mechanical rigidity, pressure resistance and cold resistance, and reducing weight and production costs.

17 Claims, 1 Drawing Sheet

"Tie Point" like a vulcanization of rubber.

(51) Int. Cl.
*C08L 77/00* (2006.01)
*F02M 35/10* (2006.01)
*C08L 67/02* (2006.01)
*C08L 77/02* (2006.01)
*C08L 77/06* (2006.01)

(56) References Cited

FOREIGN PATENT DOCUMENTS

| | | | |
|---|---|---|---|
| KR | 1020010001510 A | * | 1/2001 |
| KR | 20110077126 | | 7/2011 |

* cited by examiner

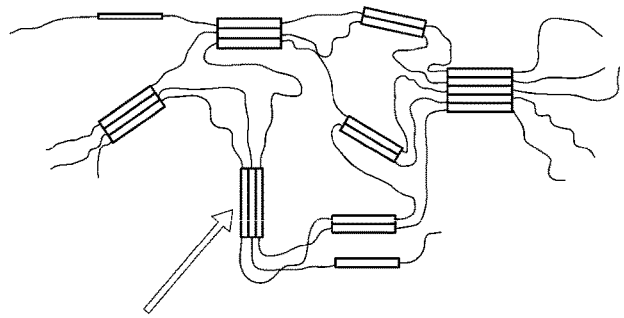
"Tie Point" like a vulcanization of rubber.
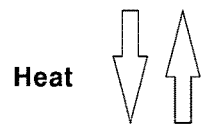
Soft   Hard   Soft   Hard   Soft
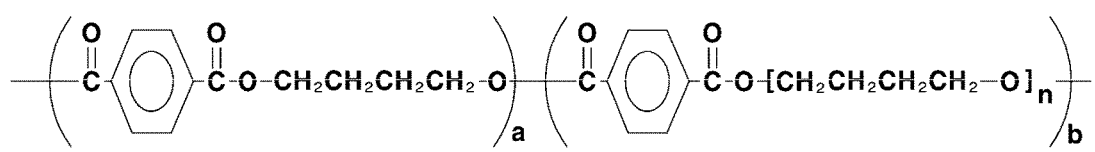

RESIN COMPOSITIONS FOR INTAKE HOSES OF TURBO ENGINES WITH ENHANCED THERMAL RESISTANCE

CROSS-REFERENCE TO RELATED APPLICATION

This application claims under 35 U.S.C. § 119(a) the benefit of and priority to Korean Patent Application No. 10-2016-0152475 filed on Nov. 16, 2016, the entire contents of which are incorporated herein by reference.

BACKGROUND

(a) Technical Field

The present disclosure relates to a resin composition for intake hoses of car turbo engines, and more particularly, to a resin composition for intake hoses of car turbo engines that exhibits excellent heat resistance and elongation by incorporating a predetermined amount of polyester elastomer into a polyamide resin and a polypropylene resin.

(b) Background Art

Fuel and air are used to operate car engines. In addition, engines receive cool air from the outside of cars via induction systems. In general, an air intake hose equipped in a car engine room functions as a channel to supply air in-taken from the outside of cars to an air filter or to supply clean air filtered by the air filter to a throttle body of a car engine, and functions to absorb vibration of the car engine.

Such an air intake hose is formed using a material for preventing heat injury from heat of engines. In particular, diesel engines or turbo engines should be formed using a material that prevents heat injury problems because they possess much higher engine heat than general gasoline.

Conventionally, epichlorohydrin rubber is used as a polymer for intake hoses, which exhibits oxygen resistance and ozone resistance due to high saturation degree of polymer chains. An air intake hose for cars, which exhibits improved resistance to nonpolar fluids or hydrocarbon derivatives and thus excellent oil resistance due to polarity of polymer chains resulting from oxygen atoms and chlorine atoms, has been used. However, the epichlorohydrin rubber has a problem of requiring addition of an antioxidant for stabilizing vulcanizates due to small amount of hydrochlorination when exposed to high temperature. In addition, the epichlorohydrin rubber has a problem of being vulnerable to aromatic chlorinated hydrocarbons, alcohols, ketones and esters as well as glycol, brake liquids and worm water and the like.

Furthermore, conventional intake hoses use ethylene methyl acrylate (EMA) as a material and a clamp ring in a connection part, thus having a problem of difficulty in weight reduction due to high weight and specific gravity. In addition, conventional intake hoses have a problem of high price.

Accordingly, there is a need for development of air intake hose materials that can prevent heat injury to engine contact areas, reduce weight of an air intake hose produced from the materials due to low weight, improve car fuel efficiency and reduce manufacturing costs.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made to solve the above-described problems associated with the prior art.

Accordingly, an intake hose for turbo engines with excellent heat resistance and elongation may be produced by using a composition prepared by incorporating a predetermined amount of polyester elastomer into a polyamide resin and a polypropylene resin, and further adding additives such as a phenol-based or phosphorous-based antioxidant, a sulfur-based heat stabilizer, an olefin-based lubricant, a master batch, and the like thereto. The present disclosure has been completed based on this finding.

Accordingly, it is one object of the present disclosure to provide a resin composition for turbo intake hoses that exhibits excellent durability, heat resistance, elongation, mechanical rigidity, pressure resistance and cold resistance, and reduces weight.

It is another object of the present disclosure to provide an intake hose produced from the resin composition for turbo intake hoses.

In one aspect, a resin composition for turbo intake hoses includes (a) 20 to 40% by weight of a polyamide resin, (b) 10 to 30% by weight of a polypropylene resin, (c) 30 to 50% by weight of a polyester elastomer, (d) 0.1 to 0.5% by weight of an antioxidant, (e) 1 to 3% by weight of a heat stabilizer, (f) 0.2 to 0.5% by weight of a lubricant, and (g) 1 to 2% by weight of a master batch.

In another aspect, an intake hose is provided for a car turbo engine produced from the resin composition for turbo intake hoses.

Other aspects and embodiments of the disclosure are discussed below.

BRIEF DESCRIPTION OF THE DRAWINGS

The above and other features will now be described in detail with reference to certain embodiments thereof illustrated the accompanying drawings which are given hereinbelow by way of illustration only, and thus are not limitative of the present disclosure, and wherein:

FIG. 1 shows a structure of a polyester elastomer.

The appended drawings are not necessarily to scale, and present a somewhat simplified representation of various features illustrative of the basic principles of the disclosure. The specific design features of the present disclosure as disclosed herein, including, for example, specific dimensions, orientations, locations, and shapes will be determined in part by the intended application and use environment.

In the FIGURES, like reference numbers refer to the same or equivalent parts of the present invention throughout the several FIGURES of the drawing.

DETAILED DESCRIPTION

Hereinafter, reference will now be made in detail to various embodiments of the present disclosure, examples of which are illustrated in the accompanying drawings and described below. While the disclosure will be described in conjunction with various embodiments, it will be understood that the present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims. In the following description, a detailed description of known functions and configurations incorporated herein will be omitted when it may obscure the subject matter of the present disclosure.

Hereinafter, embodiments of the present disclosure will be described in detail.

An air intake hose provided in an engine room of cars may be an element to supply air taken in from the outside of cars to an air filter or supply clear air filtered by the air filter to a throttle body of a car engine and to absorb vibration of the car engine.

The air intake hose should be formed using a material for preventing heat injury from heat of engines. In particular, diesel engines or turbo charger engines may be formed using a material that prevents heat injury problems because they possess much higher engine heat than general gasoline.

Accordingly, a mixture of rubber, thermoplastic elastomer (TPE), polypropylene (PP), and the like has been used as a material for air intake hoses, and materials such as polypropylene or thermoplastic elastomer (TPE) have benefits such as low weight and low production costs, but have problems of inapplicability to air intake hoses due to heat injury caused by heat of engines.

In addition, conventionally used ethylene methyl acrylate (EMA) has problems of difficulty in reducing weight due to high weight and specific gravity, and high price.

Accordingly, a resin composition is provided for intake hoses to overcome conventional technical limitations, (e.g., durability, heat resistance, and elongation).

In one embodiment, a resin composition for intake hoses includes (a) 20 to 40% by weight of a polyamide resin, (b) 10 to 30% by weight of a polypropylene resin, (c) 30 to 50% by weight of a polyester elastomer, (d) 0.1 to 0.5% by weight of an antioxidant, (e) 1 to 3% by weight of a heat stabilizer, (f) 0.2 to 0.5% by weight of a lubricant, and (g) 1 to 2% by weight of a master batch. Respective ingredients will be described in detail.

First, the polyamide resin (a) may be polyamide 66 or polyamide 6 so as to secure rigidity and heat resistance of the air intake hose. In particular, polyamide 6 may be used.

Polyamide 6 resin, broadly referred to as "nylon," is a representative engineering plastic that exhibits excellent mechanical strength, abrasion resistance, and heat resistance, which is widely used for electronic and electrical components and car components and the like. However, polyamide 6 exhibits excellent strength, but has problems of high absorbance, great dimensional change, and thus low dimensional stability.

Polyamide 6 resin has a glass transition temperature of 40 to 60° C., a heat distortion temperature (HDT) of 60 to 80° C., and a melting temperature of 200 to 250° C. Polyamide 6 resin has a repeat unit structure represented by the following Formula 1, but the present disclosure is not necessarily limited thereto.

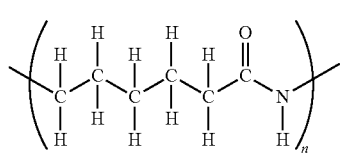

Formula 1 wherein n is an integer except for 0 and may be 50 to 250.

In order to secure rigidity and heat resistance of the air intake hose, the polyamide resin may be present in an amount of 20 to 40% by weight with respect to the total weight of the resin composition for intake hoses.

Meanwhile, the resin composition for intake hoses may include polypropylene (b). Polypropylene has advantages of excellent moldability, electrical insulation, water resistance, chemical resistance, and the like as well as low weight due to low specific gravity, but has disadvantages of low impact resistance at a low temperature and vulnerability to expansion and shrinkage.

Accordingly, polypropylene may be present in an amount of 10 to 30% by weight, with respect to the total weight of the resin composition for intake hoses. When polypropylene is present in an amount of less than 10% by weight, the desired properties of the polypropylene resin cannot be obtained, and when polypropylene is present in an amount exceeding 30% by weight, problems such as deterioration in mechanical properties and heat resistance occur. For this reason, polypropylene may be present in an amount within the range defined above.

In addition, the resin composition for intake hoses includes a polyester elastomer (c). The polyester elastomer is used to improve heat resistance of materials and may be present in an amount of 30 to 50% by weight with respect to the total weight of the resin composition. When the polyester elastomer resin is present in an amount of less than 30% by weight, heat resistance cannot be effectively realized and when the polyester elastomer resin is present in an amount exceeding 50% by weight, problems associated with molding occur due to difficult extrusion. For this reason, the polyester elastomer resin may be present in an amount within the range defined above. The structure of the polyester elastomer is shown in FIG. 1.

The polyester elastomer resin includes a hard segment and a soft segment, which are repeatedly provided so that the polyester elastomer resin has structural characteristics to realize a variety of properties due to excellent heat resistance, rigidity, and flexibility.

In some examples, the polyester elastomer includes the following structure:

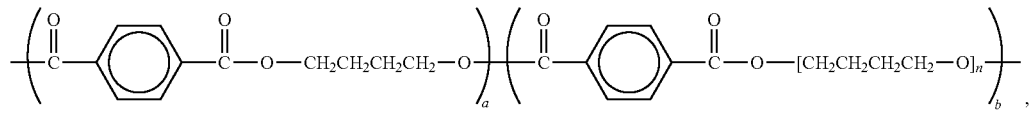

wherein a is an integer from 1 to 100, b is an integer from 0.1 to 100, and n is from 2 to 50.

The polyester elastomer may have a hardness (Shore D) of 40 to 70, a specific gravity of 1.05 to 1.25, a flexural strength of 20 to 500 megapascal (MPa), and an impact strength of 5 to 12 kg·Ecm/cm.

Furthermore, the resin composition for intake hoses may further include, as additives, an antioxidant (d), a heat stabilizer (e), a lubricant (f), and a master batch (g).

The antioxidant (d) functions to inhibit oxidation and deterioration during extrusion and injection. The antioxidant may be a phenol-based antioxidant, a phosphorous-based antioxidant, or a mixture thereof. The antioxidant may be present in an amount of 0.1 to 0.5% by weight with respect to the total weight of the resin composition. When the antioxidant is used in an amount of less than 0.1% by weight, physical properties of the material deteriorate, and when the antioxidant is used in an amount exceeding 0.5% by weight, problems associated with appearance quality may occur.

In addition, the heat stabilizer (e) is a sulfur-based heat stabilizer and functions to improve long-term heat resistance of the material upon exposure to high temperature. The heat stability may be present in an amount of 1 to 3% by weight with respect to the total weight of the resin composition. When the heat stabilizer is less than 1% by weight, heat anti-aging deteriorates, and when the heat stabilizer exceeds 3% by weight, problems such as deterioration in mechanical properties and appearance quality may occur.

Furthermore, the lubricant (f) is an olefin lubricant and functions to improve flowability and releasability of the resin. The lubricant may be present in an amount of 0.2 to 0.5% by weight with respect to the total weight of the resin composition. When the lubricant is present in an amount of less than 0.2% by weight, flowability and releasability deteriorate, and when the lubricant is present in an amount exceeding 0.5% by weight, problems such as deterioration in physical properties and fusion strength may occur.

In addition, the master batch (g) is used to improve color stability and extrusion workability and may be used in combination with carbon black, dye black, or a mixture thereof according to a conventionally known ratio and method, if necessary. A combination of carbon black and dye black may be present in a weight ratio of 1.0 to 2.0. When the master batch is present in an amount of less than 1% by weight, color stability and extrusion workability cannot be obtained and when the master batch is present in an amount exceeding 2% by weight, physical properties of the resin composition may deteriorate. For this reason, the master batch may be present in an amount of 1 to 2% by weight.

Accordingly, the resin composition for intake hoses including the ingredients described above can be provided as a material of an intake hose for a car turbo engine that exhibits improved durability and low weight, enhances car fuel efficiency, reduces production costs, optimizes balance between heat resistance and stretchability, and improves pressure resistance and acid resistance based on additional functions of functional additives.

Hereinafter, the present disclosure will be described in more detail with reference to examples. However, the examples are provided only for illustration and the scope of the present disclosure is not limited to the examples.

Comparative Examples 1 to 4 and Examples 1 to 2

Intake hose samples for measuring physical properties were produced by mixing ingredients shown in the following Table 1 in a content ratio shown in Table 1 and conducting extrusion and injection molding.

TABLE 1

Resin composition for intake hoses (unit: % by weight)

| Item (unit: wt %) | | Comparative Example 1 | Comparative Example 2 | Comparative Example 3 | Comparative Example 4 | Example 1 | Example 2 |
|---|---|---|---|---|---|---|---|
| Resin | Polyamide 66 | 30 | 40 | — | — | — | 30 |
| | Polyamide 6 | 8.0 | 8.0 | 12.9 | 21 | 30 | — |
| | Polypropylene | — | — | 33.5 | 35.4 | 26.4 | 26.4 |
| | Polyester elastomer 1) | 60 | — | — | — | 40 | 40 |
| | Olefin elastomer rubber 2) | — | 50 | 50 | 40 | — | — |
| Antioxidant | Phenol-based 3) | 0.2 | 0.2 | 0.2 | 0.2 | 0.2 | 0.2 |
| | Phosphorus-based 4) | 0.2 | 0.2 | 0.2 | 0.2 | 0.2 | 0.2 |
| Heat stabilizer 5) | | — | — | 1 | 1 | 1 | 1 |
| Lubricant 6) | | 0.3 | 0.3 | 0.2 | 0.2 | 0.2 | 0.2 |
| Master batch 7) | | 1.3 | 1.3 | 2 | 2 | 2 | 2 |
| Total content | | 100.0 | 100.0 | 100.0 | 100.0 | 100.0 | 100.0 |

1) Glass transition temperature of 47° C. heat distortion temperature (HDT) of 75° C., melting temperature of 220° C.
2) Glass transition temperature of −25° C.
3) Product name: Antioxidant 1098, Manufacturer: SONGNOX
4) Product name: Antioxidant 412S, Manufacturer: ADEKA
5) Product name: Cu
6) Product name: PPMA, Manufacturer: KOCH Test Example: Measurement of Physical Properties The specific gravity, tensile strength, flexural strength, flexural modulus, and heat resistance of samples of Comparative Examples 1 to 4, and Examples 1 to 2 were measured and measurement results of physical properties are shown in the following Table 2. The test method is shown as follows.

(1) Specific gravity: measured in accordance with D792.
(2) Tensile strength: measured in accordance with D638.
(3) Flexural strength: measured in accordance with D790.
(4) Flexural modulus: measured in accordance with D790.
(5) Heat resistance: measured in accordance with D648.

TABLE 2

| | | | Measurement results of physical properties | | | | | |
|---|---|---|---|---|---|---|---|---|
| Items | Required level | unit | Comparative Example 1 | Comparative Example 2 | Comparative Example 3 | Comparative Example 4 | Example 1 | Example 2 |
| Specific gravity | 1.0~2.0 | — | — | 0.08 | — | 0.95 | 1.09 | 1.10 |
| Tensile strength | 15 or more | MPa | — | 18.4 | — | 15 | 20.5 | 21.2 |
| Flexural strength | 8 or more | MPa | — | 12 | — | 5 | 22 | 23 |
| Flexural modulus | 200 or more | MPa | — | 395 | — | 166 | 260 | 290 |
| Heat resistance | 150 degrees × 168 HR | Appearance | — | Cracked | — | Cracked | Good | Good |

As can be seen from Table 2, in Comparative Example 1, extrusion was not possible and measurement of physical properties was thus not possible when the polyester elastomer was added in an excessive amount of 60% by weight or more.

In Comparative Example 2, because the polyamide resin was excessively used, more specifically, the polyamide 66 and polyamide 6 were used in excessive amounts of 40% by weight and 8% by weight, respectively, tensile strength was 18.4 MPa, flexural strength was 12 MPa, and flexural modulus was 395 MPa. Comparative Example 2 had a problem of greatly reduced moldability as compared to Example.

In Comparative Example 3, polyamide 6 and a polypropylene resin were used, but an olefin elastomer rubber was used in an amount of 40% by weight. Comparative Example 3 exhibited similar softness and stretchability to products, but is expected to have very low heat resistance and rigidity, and measurement of physical properties thereof was not possible because it was not cut after extrusion.

Comparative Example 4, which included a large amount (35.4% by weight) of polypropylene, had a tensile strength of 15 MPa, a flexural strength of 5 MPa and a flexural modulus of 166 MPa and exhibited satisfactory extrusion workability, but had a problem of very low rigidity as compared to Example.

On the other hand, Example 1, which included suitable amounts of polyamide 6, polypropylene and polyester elastomer, had a specific gravity of 0.98, tensile strength of 17.5 MPa, flexural strength of 9 MPa and flexural modulus of 160 MPa, exhibited superior extrusion workability and injection moldability and was suitable as a material for intake hoses in terms of rigidity of the composition. Furthermore, Example 2, in which a polyamide 66 resin is used, satisfied specific gravity, tensile strength, flexural strength and flexural modulus.

The composition includes predetermined amounts of polyamide, polypropylene, polyester elastomer and further includes an antioxidant, a heat stabilizer, a lubricant and a master batch, thus advantageously providing an intake hose with excellent durability, heat resistance and elongation. In addition, the composition advantageously exhibits excellent mechanical rigidity, pressure resistance and cold resistance, reduces weight of components due to low specific gravity, as compared to conventional materials, and reduces production costs.

As apparent from the foregoing, the resin composition for intake hoses exhibits improved durability and low weight as compared to conventional intake hose materials and thus enhances car fuel efficiency and reduces production costs. In addition, the resin composition can be provided as an intake hose material for car turbo engines that optimizes balance between heat resistance and stretchability, and improves pressure resistance and acid resistance based on additional functions of functional additives.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A resin composition for intake hoses comprising:
   20 to 40% by weight of a polyamide resin;
   10 to 30% by weight of a polypropylene resin;
   30 to 50% by weight of a polyester elastomer;
   0.1 to 0.5% by weight of an antioxidant;
   1 to 3% by weight of a heat stabilizer;
   0.2 to 0.5% by weight of a lubricant; and
   1 to 2% by weight of a master batch.

2. The resin composition of claim 1, wherein the polyamide resin comprises polyamide 66.

3. The resin composition of claim 1, wherein the polyamide resin comprises polyamide 6.

4. The resin composition of claim 1, wherein the polyester elastomer has a Shore D hardness of 40 to 70, a specific gravity of 1.05 to 1.25, a flexural strength of 20 to 500 MPa, and an impact strength of 5 to 12 kg·Ecm/cm.

5. The resin composition of claim 1, wherein the polyester elastomer comprises the following structure:

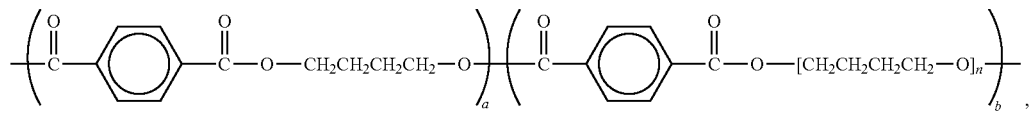

wherein:
a is an integer from 1 to 100,
b is an integer from 0.1 to 100, and
n is an integer from 2 to 50.

6. The resin composition of claim 5, wherein the antioxidant comprises a phenol-based antioxidant, a phosphorous-based antioxidant, or a mixture thereof.

7. The resin composition of claim 6, wherein the heat stabilizer comprises a sulfur-based heat stabilizer.

8. The resin composition of claim 7, wherein the lubricant comprises an olefin-based lubricant.

9. The resin composition of claim 8, wherein the master batch comprises carbon black, dye black, or a mixture thereof.

10. The resin composition of claim 1, wherein the antioxidant comprises a phenol-based antioxidant, a phosphorous-based antioxidant, or a mixture thereof.

11. The resin composition of claim 1, wherein the heat stabilizer comprises a sulfur-based heat stabilizer.

12. The resin composition of claim 1, wherein the lubricant comprises an olefin-based lubricant.

13. The resin composition of claim 1, wherein the master batch comprises carbon black, dye black, or a mixture thereof.

14. A resin composition for intake hoses comprising:
   30% by weight of a polyamide resin;
   26.4% by weight of a polypropylene resin;
   40% by weight of a polyester elastomer;
   0.2% by weight of a phenol-based antioxidant;
   0.2% by weight of a phosphorous-based antioxidant;
   1% by weight of a heat stabilizer;
   0.2% by weight of a lubricant; and
   2% by weight of a master batch.

15. The resin composition of claim 14, wherein the polyamide resin is polyamide 66.

16. The resin composition of claim 14, wherein the polyamide resin is polyamide 6.

17. An intake hose for a car turbo engine, the intake hose comprising:
   a resin composition having:
      20 to 40% by weight of a polyamide resin;
      10 to 30% by weight of a polypropylene resin;
      30 to 50% by weight of a polyester elastomer;
      0.1 to 0.5% by weight of an antioxidant;
      1 to 3% by weight of a heat stabilizer;
      0.2 to 0.5% by weight of a lubricant; and
      1 to 2% by weight of a master batch.

* * * * *